Dec. 8, 1959    F. ZERNEKE ET AL    2,916,068
BREAD SLICER
Filed Nov. 25, 1957
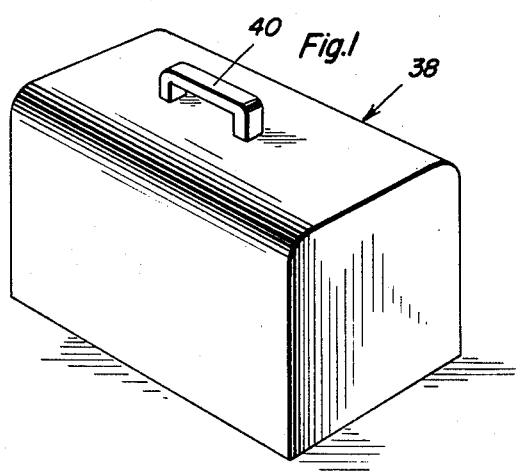
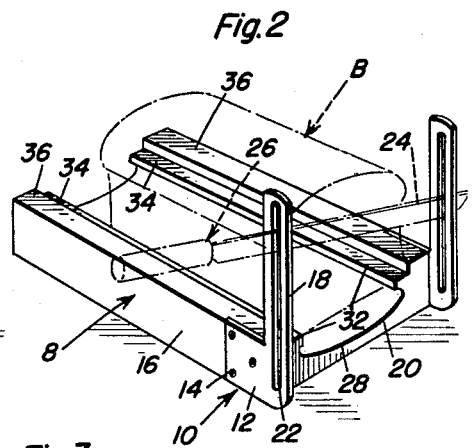
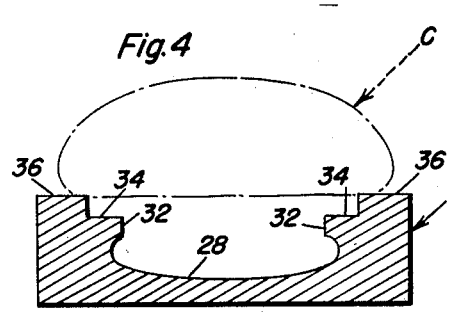
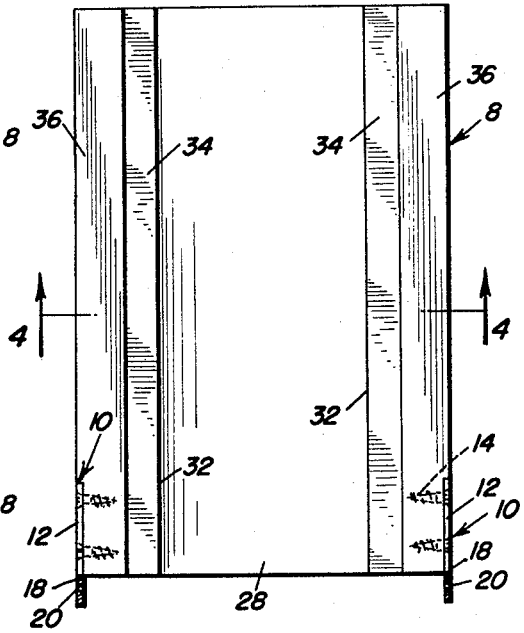
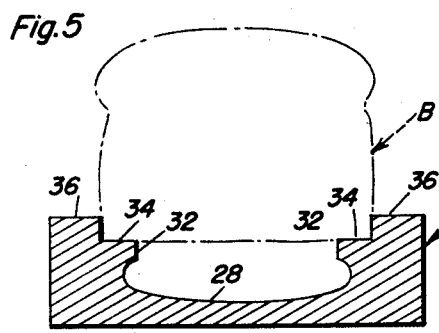
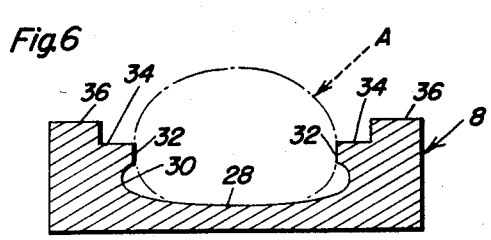
Furn Zerneke
Leonard S. Asmann
INVENTORS

United States Patent Office 2,916,068
Patented Dec. 8, 1959

2,916,068

BREAD SLICER

Furn Zerneke and Leonard S. Asmann, Union Grove, Wis.

Application November 25, 1957, Serial No. 698,520

1 Claim. (Cl. 146—150)

This invention relates to a simple and practical device for use in one's home kitchen and elsewhere and which is so designed and constructed that it may be advantageously used to support a loaf of bread and for retaining and guiding the blade of a knife while slicing the bread into uniform slices.

Bread holding and slicing devices are not, of course, new. In fact, one may safely say that in the art to which the invention relates, many and varying styles and forms of holders and slicers appear. Generally speaking, it is old in the art to provide a basing and supporting board, of one type or another, wherein slotted guide means is provided, generally at one end of the board, to control and guide the blade of the slicing knife.

It is also a matter of common knowledge that loaves of bread currently on the market vary not only in length but in cross-sectional shape. So far as is known to your applicants others working in this art have made no provision wherein loaves of bread varying in shape may be accommodatingly and aptly supported and retained, that is, in such a way that the loaf of bread, regardless of shape, is steadied by the base itself and so that the end which is being sliced will approach the blade at the desired non-slipping angle for ready and easy slicing.

The obvious object of the present invention is to construct the bread basing part of the base or board so that once the loaf is seated and readied for slicing it will remain steady and thus greatly assist the user of the device, especially if the loaf of bread is fresh, soft and difficult to manage.

Other objects, features and advantages will become more readily apparent from the following description and the accompanying drawing.

In the drawing wherein like numerals are employed to designate like parts through the views:

Fig. 1 is a perspective view of the cover.

Fig. 2 is a perspective view of the improved base showing how it is constructed and used.

Fig. 3 is a top plan view, on a slightly enlarged scale, of the base seen in Fig. 2.

Fig. 4 is a cross-section on the line 4—4 of Fig. 3, looking in the direction of the arrows and showing how the base functions in supporting a loaf of rye bread for slicing.

Fig. 5 is a view like Fig. 4 showing a loaf of so-called white bread.

Fig. 6 is a view similar to Figs. 4 and 5 showing the so-called substantially round loaf of bread and how it is held.

As seen in Fig. 2 the baseboard or block, broadly a base, is denoted by the numeral 8 and it is preferably rectangular in plan and of suitable material, wood, plastics or the like. On the longitudinal sides and at the right hand end L-shaped brackets 10 are provided. These are of duplicate construction. The relatively short horizontal arm or portion 12 is superimposed upon and fastened at 14 to the adjacent longitudinal side 16. The vertical longer arm or portion 18 projects beyond the slicing end 20 of the base and is provided with an elongated guide slot 22 for the blade 24 of the knife 26.

Referring first to the central and lowermost level of the loaf basing part of the base, it will be seen that this is characterized by an open-ended channel 28 which is of a size and shape to accommodate the so-called round loaf of bread as denoted at A in Fig. 6. For this purpose, the transverse contour is such that the channel is said to be concave.

Overhanging the side portions 30 of the channel are spaced parallel lengthwise flanges or ribs 32 having opposed vertically straight surfaces which assist in positioning and retaining the loaf A while it is being slid toward the slicing means seen in Fig. 2. The portions of the base on a level above the ribs are provided with lengthwise coplanar rabbets or grooves which function in defining appropriately shaped and positioned ledges 34 which function properly in supporting and retaining a so-called rectangular or square loaf of bread, commonly referred to in the trade as a loaf of white bread and this is depicted in Fig. 5. Therefore, Fig. 5 shows how the loaf B is supported and held while it is being sliced. It may be stated in this connection that with the narrower loaves it is possible to pass the bottom of the loaf down into the channel 28 and support the loaf against the then existing or overhanging shoulders 32 whereby to thus satisfactorily hold the loaf of bread. The coplanar flat top surfaces 36 may be used as seen in Fig. 4 to support a loaf of rye bread C. Here again, if the loaf of rye bread is small in cross-section it may be dropped down and supported on the ledges 34 as is obvious.

A suitable cover 38 is also provided and this in turn is provided with a hand-grip 40 whereby the device with the cover in place may be used as an individual bread box.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

A bread board comprising: an elongated base having therein a longitudinal, open-ended channel for the reception of the bread, said channel including a transversely concave bottom for receiving thereon, conforming substantially in shape thereto and centering a bread loaf of generally round cross-section, said channel further including side walls comprising inwardly projecting longitudinal flanges engageable with the sides of the bread loaf at an intermediate point for guiding and laterally stabilizing said bread loaf, said flanges being spaced below the top of the base and defining, in conjunction with said channel side walls, longitudinal rabbets for the reception of a generally square bread loaf, and knife guides on one end portion of the base.

References Cited in the file of this patent

UNITED STATES PATENTS

| 1,076,882 | Golden | Oct. 28, 1913 |
| 1,703,154 | Lanzkron | Feb. 26, 1929 |
| 1,721,937 | Williams | July 23, 1929 |
| 2,102,475 | McNitt | Dec. 14, 1937 |
| 2,444,704 | Keefer | July 6, 1958 |